(12) United States Patent
Ge

(10) Patent No.: US 11,605,220 B2
(45) Date of Patent: Mar. 14, 2023

(54) SYSTEMS AND METHODS FOR VIDEO SURVEILLANCE

(71) Applicant: ZHEJIANG DAHUA TECHNOLOGY CO., LTD., Zhejiang (CN)

(72) Inventor: Zhubei Ge, Hangzhou (CN)

(73) Assignee: ZHEJIANG DAHUA TECHNOLOGY CO., LTD., Hangzhou (CN)

( * ) Notice: Subject to any disclaimer, the term of this patent is extended or adjusted under 35 U.S.C. 154(b) by 7 days.

(21) Appl. No.: 17/304,324

(22) Filed: Jun. 18, 2021

(65) Prior Publication Data

US 2021/0312200 A1 Oct. 7, 2021

Related U.S. Application Data

(63) Continuation of application No. PCT/CN2018/122135, filed on Dec. 19, 2018.

(51) Int. Cl.
*G06K 9/03* (2006.01)
*G06V 10/98* (2022.01)
(Continued)

(52) U.S. Cl.
CPC ............ *G06V 10/98* (2022.01); *G06K 9/6215* (2013.01); *G06T 7/80* (2017.01); *G06V 20/52* (2022.01);
(Continued)

(58) Field of Classification Search
CPC ........ G06K 9/6215; G06K 9/627; G06T 7/80; G06V 10/98; G06V 20/52; G06V 40/172; G06V 40/173; G06V 40/50; H04N 7/181
(Continued)

(56) References Cited

U.S. PATENT DOCUMENTS

| 6,477,272 B1 | 11/2002 | Krumm et al. |
| 10,068,149 B2 | 9/2018 | Karnos |

(Continued)

FOREIGN PATENT DOCUMENTS

| CN | 103942563 A | 7/2014 |
| CN | 106611151 A | 5/2017 |

(Continued)

OTHER PUBLICATIONS

International Search Report in PCT/CN2018/122135 dated Apr. 2, 2019, 4 pages.

(Continued)

*Primary Examiner* — Thai Q Tran
*Assistant Examiner* — Stephen R Smith
(74) *Attorney, Agent, or Firm* — Metis IP LLC

(57) ABSTRACT

A system for object recognition are provided in the present disclosure. The system may obtain a first image of an object that is captured by a camera configured to capture one or more images for use in an object recognition process under a first scenario; obtain a second image of the object that is captured under a second scenario; assess a degree of similarity between the first image of the object and at least one sample image; and determine a calibration function to calibrate the degree of similarity between the first image of the object and the at least one sample image based at least on a correlation between the second image of the object and the at least one sample image, wherein the calibration function is to be applied in association with the one or more images captured by the camera in the object recognition process.

19 Claims, 8 Drawing Sheets

(51) Int. Cl.
*G06T 7/80* (2017.01)
*G06K 9/62* (2022.01)
*H04N 7/18* (2006.01)
*G06V 20/52* (2022.01)
*G06V 40/50* (2022.01)
*G06V 40/16* (2022.01)

(52) U.S. Cl.
CPC ............ *G06V 40/172* (2022.01); *G06V 40/50* (2022.01); *H04N 7/181* (2013.01)

(58) Field of Classification Search
USPC .......................................................... 348/159
See application file for complete search history.

(56) References Cited

U.S. PATENT DOCUMENTS

| | | | |
|---|---|---|---|
| 10,078,154 | B2 | 9/2018 | Logan et al. |
| 10,827,116 | B1* | 11/2020 | Terven .................... G06V 40/10 |
| 10,839,557 | B1* | 11/2020 | Arora ..................... G06T 19/006 |
| 2008/0080748 | A1 | 4/2008 | Sukegawa et al. |
| 2013/0051667 | A1 | 2/2013 | Deng et al. |
| 2015/0213589 | A1* | 7/2015 | Chou ........................ G06T 7/85 348/47 |
| 2018/0357871 | A1* | 12/2018 | Siminoff ........... G08B 13/19619 |
| 2019/0122389 | A1* | 4/2019 | Inaba ..................... G01B 11/26 |
| 2020/0250406 | A1* | 8/2020 | Wang ................... G06V 40/169 |
| 2020/0372679 | A1* | 11/2020 | Javan Roshtkhari ..... G06T 7/30 |
| 2021/0004606 | A1* | 1/2021 | Se ......................... G06V 20/647 |
| 2021/0027496 | A1* | 1/2021 | Koyama ................. G06T 7/292 |

FOREIGN PATENT DOCUMENTS

| | | |
|---|---|---|
| CN | 106981201 A | 7/2017 |
| CN | 108898185 A | 11/2018 |
| CN | 109002767 A | 12/2018 |
| EP | 1020811 A2 | 7/2000 |
| KR | 101732115 B1 | 5/2017 |

OTHER PUBLICATIONS

Written Opinion in PCT/CN2018/122135 dated Apr. 2, 2019, 4 pages.
First Examination Report in Indian Application No. 202117027292 dated Mar. 17, 2022, 6 pages.

* cited by examiner

700

| A second image | A library of face images | reference degree of similarity |
|---|---|---|
| A_test | A_regis | 98% |
| A_test | B_regis | 90% |
| A_test | C_regis | 80% |
| A_test | D_regis | 70% |
| A_test | E_regis | 50% |
| …… | …… | …… |

| A first image | A second image | A library of face images | Degree of similarity | Reference degree of similarity |
|---|---|---|---|---|
| A_test_K | A_test | A_regis | 94% | 98% |
| A_test_K | A_test | B_regis | 86% | 90% |
| A_test_K | A_test | C_regis | 73% | 80% |
| A_test_K | A_test | D_regis | 67% | 70% |
| A_test_K | A_test | E_regis | 43% | 50% |
| …… | …… | …… | …… | …… |

FIG. 8

SYSTEMS AND METHODS FOR VIDEO SURVEILLANCE

CROSS-REFERENCE TO RELATED APPLICATIONS

This application is a Continuation of International Application No. PCT/CN2018/122135, filed on Dec. 19, 2018, the entire contents of which are hereby incorporated by reference.

TECHNICAL FIELD

This disclosure generally relates to video surveillance, and more particularly, relates to systems and methods for recognizing an object in video surveillance.

BACKGROUND

With the development and wide application of the video surveillance techniques, object recognition is broadly applied in various environmental scenarios. Usually, a similarity threshold for object collating (e.g., face collating) is provided in an object recognition process. If a similarity between an image of an object of interest and an image obtained from the video surveillance exceeds the similarity threshold, the object of interest is determined to be found.

However, images of a same object captured under different scenarios may be different. For example, the same object in different images captured under different scenarios (e.g., by different cameras at different locations) may have different features. The differences may influence the determination of the similarity between images, thus decreasing the accuracy of objection recognition in various scenarios.

SUMMARY

According to an aspect of the present disclosure, a system is provided. The system may include a camera configured to capture one or more images for use in an object recognition process, a storage device storing a set of instructions; and at least one processor in communication with the storage device. When executing the instructions, the at least one processor may be configured to cause the system to obtain a first image of an object that is captured by the camera under a first scenario; obtain a second image of the object that is captured under a second scenario; assess a degree of similarity between the first image of the object and at least one sample image; and determine a calibration function to calibrate the degree of similarity between the first image of the object and the at least one sample image based at least on a correlation between the second image of the object and the at least one sample image, wherein the calibration function is to be applied in association with the one or more images captured by the camera in the object recognition process.

In some embodiments, the at least one processor is configured to cause the system to obtain a reference degree of similarity between the second image of the object and the at least one sample image.

In some embodiments, the at least one processor is configured to cause the system to designate a function indicating a relationship between the degree of similarity between the first image of the object and the at least one sample image and the reference degree of similarity between the second image of the object and the at least one sample image as the calibration function.

In some embodiments, the calibration function may be to be applied to calibrate one or more degrees of similarity between the one or more images captured by the camera and an image of a registrant stored in a memory.

In some embodiments, the image of the registrant may include a face image of a suspicious-looking person.

In some embodiments, the one or more degrees of similarity between the one or more images captured by the camera and the image of the registrant may be to be compared with a threshold for authentication used for face collating in the object recognition process.

In some embodiments, the first image of the object may be captured when the camera is working in a surveillance state.

In some embodiments, the second image of the object may be captured when the object is in a substantially stationary state.

In some embodiments, the first image of the object may include a face image of a person.

In some embodiments, the at least one sample image may be selected from a library of face images.

In some embodiments, the library of face images may include at least one reference face image of the person.

In some embodiments, the at least one processor is configured to cause the system to select a plurality of face images in the library of face images; and calculate a plurality of first similarity values, each of the plurality of first similarity values indicating a similarity between the first image of the object and one of the plurality of face images.

According to another aspect of the present disclosure, a system is provided. The system may include a storage device to store a plurality of sample images; and a processing device, communicatively coupled to the storage device. The processing device may calculate, based on a first image of a first object captured in a first scenario, a first similarity table comprising first similarity values, each one of the first similarity values representing a likelihood of the first object presenting in a corresponding one of the plurality of sample images; calculate, based on the second image of the first object captured in a second scenario, a second similarity table comprising second similarity values, each one of the second similarity values representing a likelihood of the first object presenting in a corresponding one of the plurality of sample images; calculate a compensation factor based on a mapping between the first similarity table and the second similarity table; and responsive to receiving a third image captured in the first scenario, determine presence of a second object in the third image by comparing a threshold value with a similarity value, adjusted by the compensation factor, between the third image with an image of a registrant.

In some embodiments, the object may include a human object.

In some embodiments, the first image of the object may be captured in the first scenario using a first camera, and the second image of the object may be captured in the second scenario using a second camera.

In some embodiments, the third image may be captured using the first camera.

In some embodiments, the processing device may further receive the first image of the object captured by the first camera in a first location; and receive the second image of the object captured by the second camera in a second location.

In some embodiments, the processing device may further determine the threshold based on an object detection error rate in the first scenario.

In some embodiments, the processing device may further receive the second image of the object captured in the second scenario; add the second image to the plurality of sample images; and calculate, based on the second image of the object captured in the second scenario, the first similarity table.

In some embodiments, the image of a registrant may include a face image of a suspicious-looking person.

Additional features will be set forth in part in the description which follows, and in part will become apparent to those skilled in the art upon examination of the following and the accompanying drawings or may be learned by production or operation of the examples. The features of the present disclosure may be realized and attained by practice or use of various aspects of the methodologies, instrumentalities and combinations set forth in the detailed examples discussed below.

BRIEF DESCRIPTION OF THE DRAWINGS

The present disclosure is further described in terms of exemplary embodiments. These exemplary embodiments are described in detail with reference to the drawings. The drawings are not to scale. These embodiments are non-limiting exemplary embodiments, in which like reference numerals represent similar structures throughout the several views of the drawings, and wherein:

FIG. 7 is a schematic diagram illustrating exemplary reference degrees of similarity related to face recognition in the form of a table according to some embodiments of the present disclosure; and FIG. 8 is a schematic diagram illustrating exemplary degrees of similarity related to face recognition in the form of a table according to some embodiments of the present disclosure.

DETAILED DESCRIPTION

Figure 1:
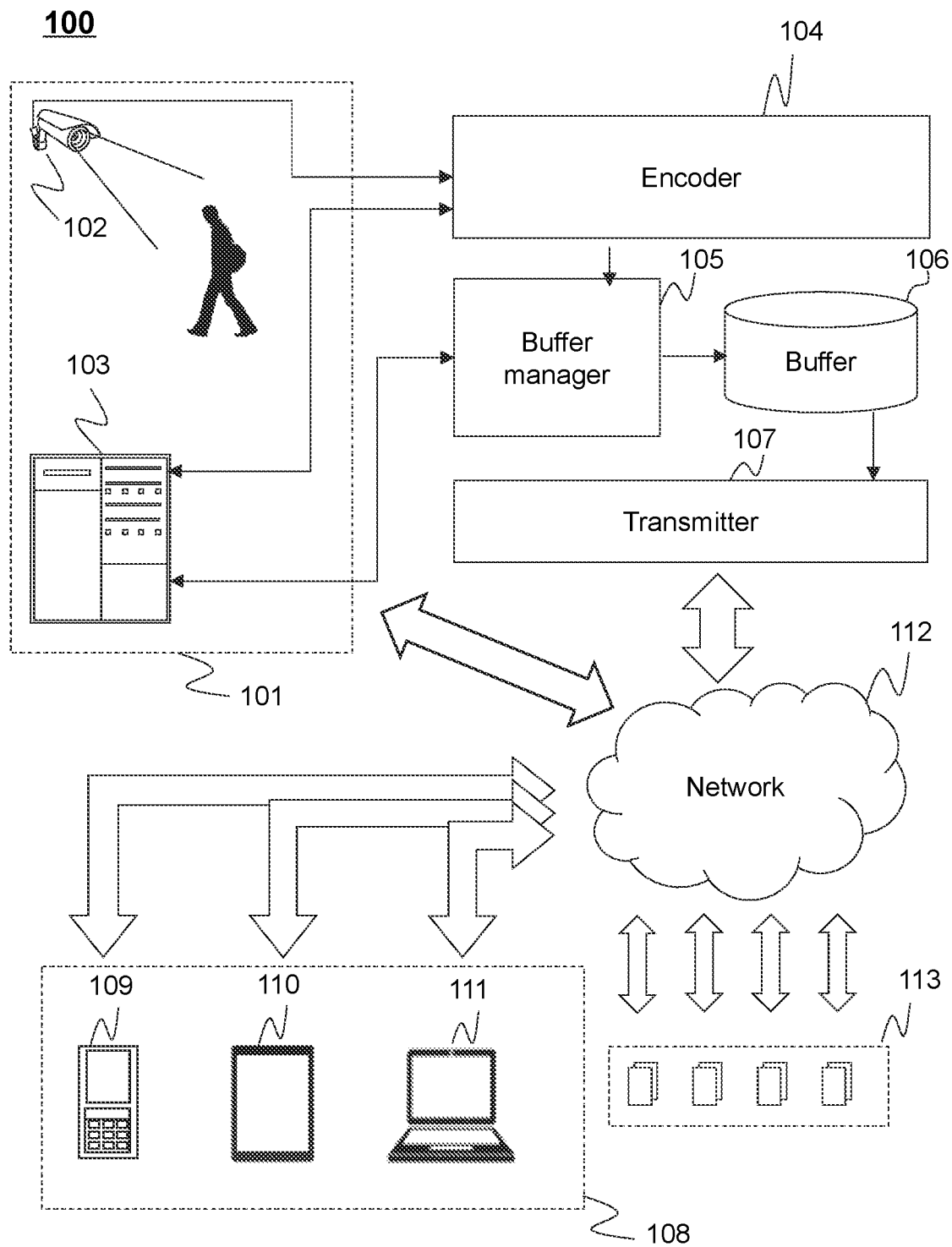
FIG. 1 is a schematic diagram illustrating an exemplary object recognition system according to some embodiments of the present disclosure.

In order to illustrate the technical solutions related to the embodiments of the present disclosure, brief introduction of the drawings referred to in the description of the embodiments is provided below. Obviously, drawings described below are only some examples or embodiments of the present disclosure. Those having ordinary skills in the art, without further creative efforts, may apply the present disclosure to other similar scenarios according to these drawings. Unless stated otherwise or obvious from the context, the same reference numeral in the drawings refers to the same structure and operation.

As used in the disclosure and the appended claims, the singular forms "a," "an," and "the" include plural referents unless the content clearly dictates otherwise. It will be further understood that the terms "comprises," "comprising," "includes," and/or "including" when used in the disclosure, specify the presence of stated steps and elements, but do not preclude the presence or addition of one or more other steps and elements.

Some modules of the system may be referred to in various ways according to some embodiments of the present disclosure, however, any number of different modules may be used and operated in a client terminal and/or a server. These modules are intended to be illustrative, not intended to limit the scope of the present disclosure. Different modules may be used in different aspects of the system and method.

According to some embodiments of the present disclosure, flow charts are used to illustrate the operations performed by the system. It is to be expressly understood, the operations above or below may or may not be implemented in order. Conversely, the operations may be performed in inverted order, or simultaneously. Besides, one or more other operations may be added to the flowcharts, or one or more operations may be omitted from the flowchart.

Technical solutions of the embodiments of the present disclosure be described with reference to the drawings as described below. It is obvious that the described embodiments are not exhaustive and are not limiting. Other embodiments obtained, based on the embodiments set forth in the present disclosure, by those with ordinary skill in the art without any creative works are within the scope of the present disclosure.

In an aspect, the present disclosure is directed to systems and methods for recognizing an object in one or more images. Specifically, the one or more images may be captured by at least one camera working in a surveillance state. In some embodiments, the recognition process may be performed by collating the one or more images with a reference image to generate, for example, a degree of similarity indicating the likelihood of the object presenting in the reference image. The similarity may be further adjusted by a calibration function to compare with a threshold for authentication. In some embodiments, to generate the calibration function, the at least one camera may capture an image of a target in a first scenario, which is further compared with a plurality of sample images to generate a plurality of first similarity values. Another image of the target captured in a second scenario may also be used to compare with the plurality of sample images to generate a plurality of second similarity values. Then, the calibration function may be generated based on a mapping relationship between the plurality of first similarity values and the plurality of second similarity values.

FIG. 1 is a schematic diagram illustrating an exemplary object recognition system according to some embodiments of the present disclosure. The object recognition system 100 may be configured to process an image or a video composed of a plurality of images (also referred to as "video frames"). As shown, the object recognition system 100 may include a video source 101, an encoder 104, a buffer manager 105, a buffer 106, a transmitter 107, a terminal 108 (or a plurality of terminals 108), a network 112, and a network storage device 113 (or a plurality of network storage devices 113).

The video source 101 may transmit a video through the network 112 to a terminal 108. The video source 101 may generate the video itself or via a video transfer site. The video source 101 may include a camera 102 and/or a server 103.

The camera 102 may be configured to perform surveillance of an area of interest (AOI). In some embodiments, the camera 102 may be a stationary video sensor or a mobile video sensor. As used herein, a video sensor may refer to an apparatus for visual recording. The video sensor may capture image data relating to an AOI or an object of interest. The image data may include a video, an image, or a combination thereof. As used herein, the term "video" may refer to motion pictures represented in analog and/or digital form. For example, a video may include movies, image sequences from a camera or other observer, computer-generated image sequences, or the like, or a combination thereof. As used herein, a sequence (also referred to as a frame) may refer to a particular image or other discrete unit within a video. A video sensor may be implemented in a video camera. The video camera may include a color camera, a digital video camera, a camcorder, a PC camera, a webcam, an infrared (IR) video camera, a low-light video camera, a thermal video camera, a CCTV camera, a pan, a tilt, a zoom (PTZ) camera, a video sensing device, an Internet Protocol (IP) camera, or the like, or a combination thereof. The image may be a three-dimensional (3D) image or a two-dimensional (2D) image.

In some embodiments, the camera 102 may include camera processing circuits. The camera processing circuits may be configured to process data and/or information relating to the camera 102 in the present disclosure and/or control one or more components (e.g., the lens, the shutter) in the camera 102. For example, the camera processing circuits may automatically determine a value of the exposure parameter of the camera 102 such as an exposure time, an exposure gain, and an aperture size. The camera processing circuits may also adjust quality of images taken by the camera 102, such as the sharpness of the images. For another example, the camera processing circuits may determine whether a person is detected by the camera 102. In response to a determination that a person is detected, the camera processing circuits may capture a front face of the person using the camera 102. In some embodiments, the camera processing circuits may be local to or remote from the camera 102. For example, the camera processing circuits may communicate with the camera 102 via the network 112. As another example, the camera processing circuits may be integrated into the camera 102.

It shall be noted that images captured under different scenarios may be different. In some embodiments, the difference between different scenarios lie in the amount of illumination, the type of illumination (e.g., sunlight, white light, yellow light), the angle of illumination, the weather (e.g., rainy, foggy, sunny), the shooting angle of the camera 102, or the like, or any combination thereof. The difference between different scenarios may result in different features of the same object in the different images captured in the different scenarios. For example, the same object captured under different illuminations may appear with different colors in the different images. For another example, the same object in an image captured in a foggy day may appear vaguer than an image captured in a sunny day. In some embodiments, the differences between different scenarios may be associated with different locations of different cameras. For example, the camera 102 may include a plurality of cameras, each of which may be located at a specific location and thus work under a different scenario from the other camera(s).

In some embodiments, one or more components of the object recognition system 100 may process an image by calibrating the image or at least one parameter associated with the image according to the scenario under which the image is captured. For example, one or more components of the object recognition system 100 may process an image captured by a certain camera according to the scenario under which the image is captured and a standardized scenario. As used herein, a standardized scenario may refer to a scenario with a predefined condition, such as a predefined illumination, a predefined weather, a predefined shooting angle, or the like, under which the certain camera may capture images.

In some embodiments, the camera 102 may include a storage device. The storage device may store data, instructions, and/or any other information. In some embodiments, the storage device may store data obtained from the processing device. For example, the storage device may store captured images. In some embodiments, the storage device may store data and/or instructions that the processing device may execute or use to perform exemplary methods described in the present disclosure. In some embodiments, the storage device may include a mass storage, removable storage, a volatile read-and-write memory, a read-only memory (ROM), or the like, or any combination thereof. Exemplary mass storage may include a magnetic disk, an optical disk, a solid-state drive, etc. Exemplary removable storage may include a flash drive, a floppy disk, an optical disk, a memory card, a zip disk, a magnetic tape, etc. Exemplary volatile read-and-write memory may include a random-access memory (RAM). Exemplary RAM may include a dynamic RAM (DRAM), a double date rate synchronous dynamic RAM (DDR SDRAM), a static RAM (SRAM), a thyristor RAM (T-RAM), and a zero-capacitor RAM (Z-RAM), etc. Exemplary ROM may include a mask ROM (MROM), a programmable ROM (PROM), an erasable programmable ROM (EPROM), an electrically erasable programmable ROM (EEPROM), a compact disk ROM (CD-ROM), and a digital versatile disk ROM, etc.

The server 103 may process data and/or information obtained from the camera 102, the network storage device 113, or the like. For example, the server 103 may obtain image data (e.g., an image, a video, etc.) from the camera 102 and/or the network storage device 113. The server 103 may identify an object (e.g., a human, a human face) based on the image data. The server 103 may assess a similarity between the object in the image data and an object of interest obtained from, for example, the network storage device 113.

In some embodiments, the server 103 may identify the specific scenario of the camera 102, and calibrate images captured by the camera 102 or at least one parameter associated with the images according to the specific scenario. For example, the server 103 may identify a scenario of daytime when the camera 102 is capturing images, and calibrate the images captured in the daylight according to a first calibration function. The server 103 may also identify a scenario of nighttime when the camera 102 is capturing images, and calibrate the images captured in the nighttime according to a second calibration function. The first calibration function and the second calibration function may be the same or different. As another example, the server 103 may identify a scenario of a first location where a first camera 102 is capturing images, and calibrate the images captured at the first location according to a third calibration function. The server 103 may also identify a scenario of a second location where a second camera 102 is capturing images, and calibrate the images captured at the second location according to a fourth calibration function. The third calibration function and the fourth calibration function may be the same or different.

In some embodiments, the server 103 may identify the scenario based on camera information related to the camera 102 and the environment condition. The camera information may include one or more setting parameters of the camera 102. The environment condition may include the location of the camera 102, the ambient illuminating condition of the camera 102, the weather, the time, or the like, or any combination thereof.

In some embodiments, the server 103 may calculate, based on a first image of an object captured in a first scenario, a first similarity between the first image and at least one sample image. The server 103 may calculate, based on a second image of the object captured in a second scenario, a second similarity between the second image and the at least one sample image. The server 103 may further calculate a calibration function based on a mapping relationship between the first similarity and the second similarity. The calibration function may be further used to calibrate the similarity between different images and thus increase the accuracy of object recognition in video surveillance.

In some embodiments, the server 103 may receive an inquiry about an object of interest (e.g., an image of registrant including a suspicious-looking person) from a terminal device (e.g., the terminal 108). The server 103 may search for the object of interest based on image data captured by the camera 102. The server 103 may transmit information related to the object of interest to be displayed on the terminal 108 in response to the inquiry. The information related to the object of interest may include an alarm. The alarm may include a position of the object of interest, an appearing time of the object of interest, a moving track of the object of interest, or the like, or any combination thereof. The information may be displayed on the terminal device in a text, a form, a chart, an image, a video, an audio, etc.

In some embodiments, the server 103 may be a workstation or server. For example, the server 103 may be a single server or a server group. The server group may be centralized or distributed. In some embodiments, the server 103 may be local or remote. For example, the server 103 may access information and/or data stored in the camera 102 and/or the network storage device 113 via the network 112. As another example, the server 103 may be directly connected to the camera 102 and/or the network storage device 113 to access stored information and/or data. In some embodiments, the server 103 may be implemented on a cloud platform. Merely by way of example, the cloud platform may include a private cloud, a public cloud, a hybrid cloud, a community cloud, a distributed cloud, an inter-cloud, a multi-cloud, or the like, or a combination thereof.

Before transmitting a video through the network 112, the video source 101 may send the video to the encoder 104 for encoding the video, or send the video to the buffer 106 through the buffer manager 105. For example, the video provided by the video source 101 may be relatively large in size (e.g., raw video data, video encoded with low compression rate), thus before the transmission the video source 101 may send the video to the encoder 104 for video compression. As another example, the video provided by the video source 101 may be proper in size, and the video source 101 may directly send the video to the buffer 106 through the buffer manager 105 for video transmission.

An encoder 104 may be a remote device from the video source 101 or a local device interpreted in the video source 101. It may encode the video provided by the video source 101 before the video is transmitted through the network 112. Through encoding, the video to be transmitted may be compressed and/or encrypted. For example, the encoder 104 may encode a video using an algorithm for video compression so that the cost (e.g., time cost, resource cost, financial cost) for transmitting the video may be significantly reduced. Alternatively or additionally, the encoder 104 may encode a video using an algorithm for video encryption so that the video may be transmitted safely and a user without permission may not watch the video. The encoder 104 may encode the video frame by frame and generate a plurality of encoded video frames. The encoder 104 may send the encoded video frame to the buffer 106 through the buffer manager 105. Alternatively or additionally, the buffer manager 105 may obtain the encoded video frame from the encoder 104. In some embodiments, the encoder 104 may encode the video to be transmitted using a Moving Picture Experts Group (MPEG) based encoding technique.

The video frames and/or images to be transmitted may be stored in the buffer 106 in a form of a video frame buffering queue, which may be managed by the buffer manager 105. The buffer 106 may use a queue based data structure for buffering the video to be transmitted.

The buffer 106 may be a storage device for buffering the video to be transmitted through the network 112. It may be a remote device from the video source 101 or a local device interpreted in the video source 101, such as the storage medium of the camera 102. The buffer 106 may include a mass storage device, a removable storage device, a volatile read-and-write memory, a read-only memory (ROM), or the like, or any combination thereof. Exemplary mass storage may include a magnetic disk, an optical disk, a solid-state drive, etc. Exemplary removable storage may include a flash drive, a floppy disk, an optical disk, a memory card, a zip disk, a magnetic tape, etc. Exemplary volatile read-and-write memory may include a random-access memory (RAM), such as a dynamic RAM (DRAM), a double date rate synchronous dynamic RAM (DDR SDRAM), a static RAM (SRAM), a thyristor RAM (T-RAM), and a zero-capacitor RAM (Z-RAM). Exemplary ROM may include a mask ROM (MROM), a programmable ROM (PROM), an erasable programmable ROM (EPROM), an electrically erasable programmable ROM (EEPROM), a compact disk ROM (CD-ROM), and a digital versatile disk ROM, etc.

The transmitter 107 may transmit the video or video frames buffered in the buffer 106 to the network 112. The transmitter 107 may transmit video or video frames in response to instructions sent from the video provider 101, the buffer manager 105, the terminal 108, or the like, or a combination thereof. Alternatively or additionally, the transmitter 107 may spontaneously transmit video or video frames stored in the buffer 106. The transmitter 107 may transmit video or video frames through the network 112 to the terminal 108 though one or more network connections (wired and/or wireless).

In some embodiments, the transmitter 107 may be capable of determining the transmission performance of the network 112. For example, the transmitter 107 may monitor its data transmitted rate for determining the transmission performance.

The terminal 108 may receive the transmitted video and/or information related to the image of registrant through the network 112. The terminal 108 may decode (e.g., through a video player installed on the terminal 108) the transmitted video or video frames using a decoding algorithm and display the video to a user. The decoding algorithm may correspond to the encoding algorithm used by the encoder 104.

The terminal 108 may be various in forms. For example, the terminal 108 may include a mobile device 109, a tablet computer 110, a laptop computer 111, or the like, or any combination thereof. In some embodiments, the mobile device 109 may include, a wearable device, a mobile device, a virtual reality device, an augmented reality device, or the like, or any combination thereof. In some embodiments, the wearable device may include a bracelet, footgear, eyeglasses, a helmet, a watch, clothing, a backpack, a smart accessory, or the like, or any combination thereof. In some embodiments, the mobile device may include a mobile phone, a personal digital assistance (PDA), a laptop, a tablet computer, a desktop, or the like, or any combination thereof. In some embodiments, the virtual reality device and/or the augmented reality device may include a virtual reality helmet, virtual reality glasses, a virtual reality patch, an augmented reality helmet, augmented reality glasses, an augmented reality patch, or the like, or any combination thereof. For example, the virtual reality device and/or the augmented reality device may include a Google Glass™, an Oculus Rift™, a Hololens™, a Gear VR™, etc. In some embodiments, the terminal(s) 108 may be part of a processing engine.

The network 112 may include any suitable network that can facilitate a transmission of a video provided by the video source 101 to the terminal(s) 108. The network 112 may be and/or include a public network (e.g., the Internet), a private network (e.g., a local area network (LAN), a wide area network (WAN)), a wired network (e.g., an Ethernet network), a wireless network (e.g., an 802.11 network, a Wi-Fi network), a cellular network (e.g., a Long Term Evolution (LTE) network), a frame relay network, a virtual private network ("VPN"), a satellite network, a telephone network, routers, hubs, switches, server computers, and/or any combination thereof. Merely by way of example, the network 112 may include a cable network, a wireline network, a fiber-optic network, a telecommunications network, an intranet, a wireless local area network (WLAN), a metropolitan area network (MAN), a public telephone switched network (PSTN), a Bluetooth™ network, a ZigBee™ network, a near field communication (NFC) network, or the like, or any combination thereof. In some embodiments, the network 112 may include one or more network access points. For example, the network 112 may include wired and/or wireless network access points such as base stations and/or internet exchange points through which a video provided by the video source 101 may be transmitted to the terminal 108.

In some embodiments, the network 112 may include one or more network storage devices 113. The network storage device 113 may be a device for buffering or caching data transmitted in the network 112. The video or video frame transmitted by the transmitter 107 may be buffered or cashed in one or more network storage devices 113 before being received by the terminal 108. The image of registrant may be buffered or cashed in one or more network storage devices 113. The network storage device 113 may be a server, a hub, a gateway, or the like, or a combination thereof.

It may be noted that, one or more of the encoder 104, buffer manager 105, buffer 106 and transmitter may be a stand-alone device, or a module integrated into the video source 101 or another stand-alone device. For example, one or more of the encoder 104, buffer manager 105, buffer 106 and transmitter 107 may be integrated into the camera 102 or the server 103. As another example, the encoder 104, buffer manager 105, buffer 106 and transmitter 107 may be included in a video processing engine which may communicate with the video source 101 through direct wired connection, the network 112, or another network not shown. As a further example, the encoder 104 may be a stand-alone device (e.g., a computer or a server), while the buffer manager 105, buffer 106 and transmitter 107 may be included in another stand-alone device.

Figure 2:
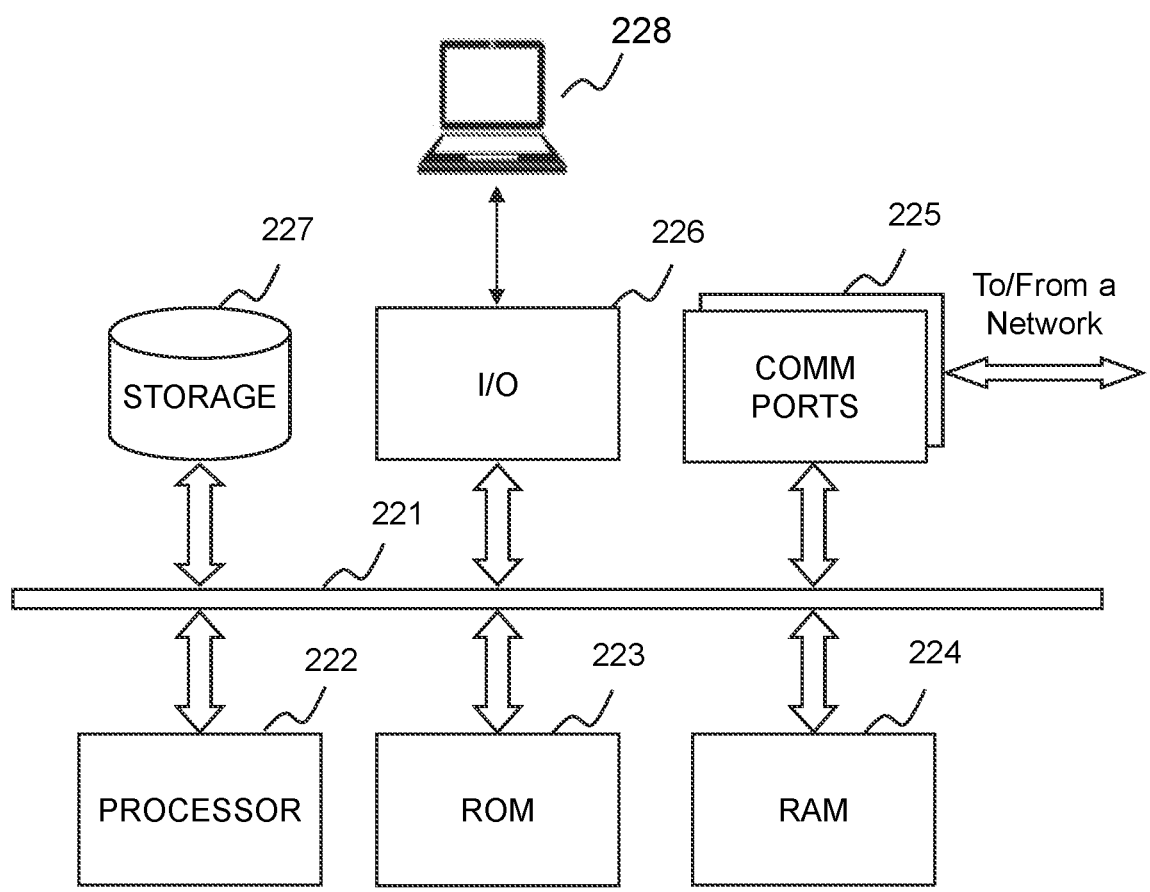
FIG. 2 is a schematic diagram illustrating exemplary hardware and/or software components of an exemplary computing device according to some embodiments of the present disclosure.

FIG. 2 is a schematic diagram illustrating exemplary hardware and/or software components of an exemplary computing device according to some embodiments of the present disclosure. For example, the computing device 200 may be the server 103, the camera processing circuits of the camera 102, and/or an electronic device specialized in video or image processing. The encoder 104 and buffer manager 105 may also be implemented on the computing device 200. As illustrated in FIG. 2, the computing device 200 may include a processor 222, a storage 227, an input/output (I/O) 226, and a communication port 225.

The processor 222 (e.g., logic circuits) may execute computer instructions (e.g., program code) and perform functions in accordance with techniques described herein. For example, the processor 222 may include interface circuits and processing circuits therein. The interface circuits may be configured to receive electronic signals from a bus (not shown in FIG. 2), wherein the electronic signals encode structured data and/or instructions for the processing circuits to process. The processing circuits may conduct logical operations calculations, and then determine a conclusion, a result, and/or an instruction encoded as electronic signals. Then the interface circuits may send out the electronic signals from the processing circuits via the bus.

The computer instructions may include, for example, routines, programs, objects, components, data structures, procedures, modules, and functions, which perform particular functions described herein. In some embodiments, the processor 222 may include one or more hardware processors, such as a microcontroller, a microprocessor, a reduced instruction set computer (RISC), an application specific integrated circuits (ASICs), an application-specific instruction-set processor (ASIP), a central processing unit (CPU), a graphics processing unit (GPU), a physics processing unit (PPU), a microcontroller unit, a digital signal processor (DSP), a field programmable gate array (FPGA), an advanced RISC machine (ARM), a programmable logic device (PLD), any circuit or processor capable of executing one or more functions, or the like, or any combinations thereof.

Merely for illustration, only one processor is described in the computing device 200. However, it should be noted that the computing device 200 in the present disclosure may also include multiple processors, thus operations and/or method operations that are performed by one processor as described in the present disclosure may also be jointly or separately performed by the multiple processors. For example, if in the present disclosure the processor of the computing device 200 executes both operation A and operation B, it should be understood that operation A and operation B may also be performed by two or more different processors jointly or separately in the computing device 200 (e.g., a first processor executes operation A and a second processor executes operation B, or the first and second processors jointly execute operations A and B).

The storage 227 may store data/information obtained from the video source 101, the encoder 104, the buffer manager 105, the buffer 106, the transmitter 107, the terminal 108, the network 112, the network storage device 113, and/or any other component of the object recognition system 100. In some embodiments, the storage 222 may include a mass storage, removable storage, a volatile read-and-write memory, a read-only memory (ROM), or the like, or any combination thereof. For example, the mass storage may include a magnetic disk, an optical disk, a solid-state drive, etc. The removable storage may include a flash drive, a floppy disk, an optical disk, a memory card, a zip disk, a magnetic tape, etc. The volatile read-and-write memory may include a random-access memory (RAM), which may include a dynamic RAM (DRAM), a double date rate synchronous dynamic RAM (DDR SDRAM), a static RAM (SRAM), a thyristor RAM (T-RAM), and a zero-capacitor RAM (Z-RAM), etc. The ROM may include a mask ROM (MROM), a programmable ROM (PROM), an erasable programmable ROM (EPROM), an electrically erasable programmable ROM (EEPROM), a compact disk ROM (CD-ROM), and a digital versatile disk ROM, etc. In some embodiments, the storage 222 may store one or more programs and/or instructions to perform exemplary methods described in the present disclosure.

The I/O 226 may input and/or output signals, data, information, etc. In some embodiments, the I/O 226 may include an input device and an output device. Examples of the input device may include a keyboard, a mouse, a touch screen, a microphone, or the like, or a combination thereof. Examples of the output device may include a display device, a loudspeaker, a printer, a projector, or the like, or a combination thereof. Examples of the display device may include a liquid crystal display (LCD), a light-emitting diode (LED)-based display, a flat panel display, a curved screen, a television device, a cathode ray tube (CRT), a touch screen, or the like, or a combination thereof.

The communication port 225 may be connected to a network (e.g., the network 112) to facilitate data communications. The communication port 225 may establish connections between the video source 101, the encoder 104, the buffer manager 105, the buffer 106, the transmitter 107, the terminal 108, the network 112, the network storage device 113, and/or any other component of the object recognition system 100. The connection may be a wired connection, a wireless connection, any other communication connection that can enable data transmission and/or reception, and/or any combination of these connections. The wired connection may include, for example, an electrical cable, an optical cable, a telephone wire, or the like, or any combination thereof. The wireless connection may include, for example, a Bluetooth™ link, a Wi-Fi™ link, a WiMax™ link, a WLAN link, a ZigBee link, a mobile network link (e.g., 3G, 4G, 5G), or the like, or a combination thereof. In some embodiments, the communication port 2400 may be and/or include a standardized communication port, such as RS232, RS485, etc. In some embodiments, the communication port 225 may be a specially designed communication port.

Figure 3:
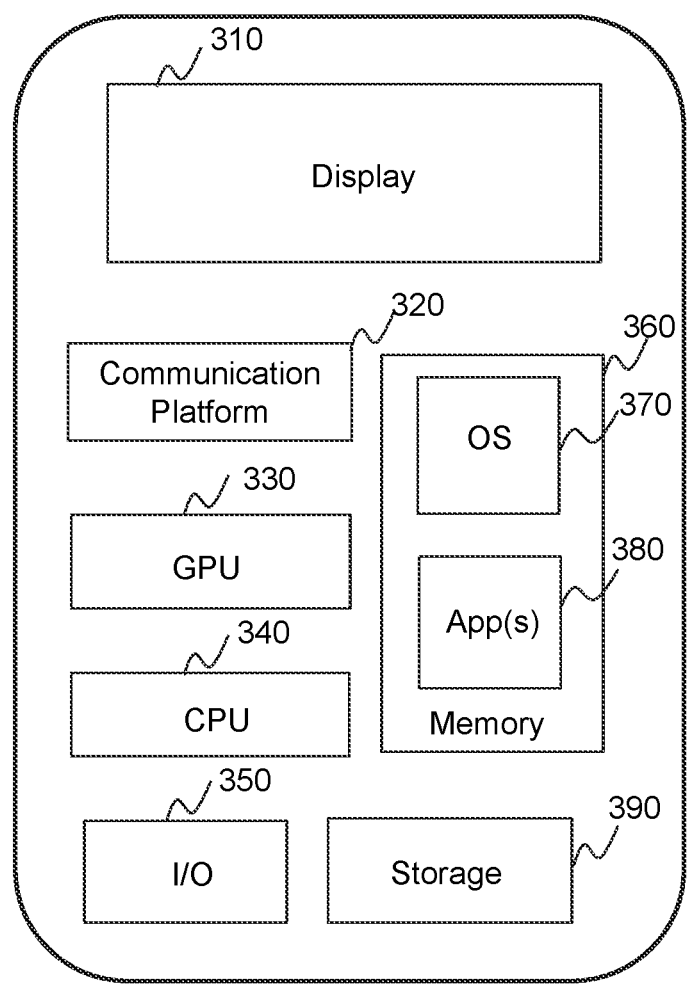
FIG. 3 is a schematic diagram illustrating exemplary components of an exemplary user device according to some embodiments of the present disclosure.

FIG. 3 is a schematic diagram illustrating exemplary components of an exemplary user device according to some embodiments of the present disclosure. As illustrated in FIG. 3, the user device 300 may include a communication platform 320, a display 310, a graphic processing unit (GPU) 330, a central processing unit (CPU) 330, an I/O port 350, a memory 360, and a storage 390. In some embodiments, any other suitable component, including but not limited to a system bus or a controller (not shown), may also be included in the user device 300. In some embodiments, a mobile operating system 370 (e.g., iOS™, Android™, Windows Phone™) and one or more applications 380 may be loaded into the memory 360 from the storage 390 in order to be executed by the processor 340. The user device 300 may be an embodiment of the terminal 108. The applications 380 may include a video player for receiving a video provided by the video source 101 through the network 112 and decode the received video.

To implement various modules, units, and their functionalities described in the present disclosure, computer hardware platforms may be used as the hardware platform(s) for one or more of the elements described herein. A computer with user interface elements may be used to implement a personal computer (PC) or any other type of work station or terminal device. A computer may also act as a server if appropriately programmed.

Figure 4:
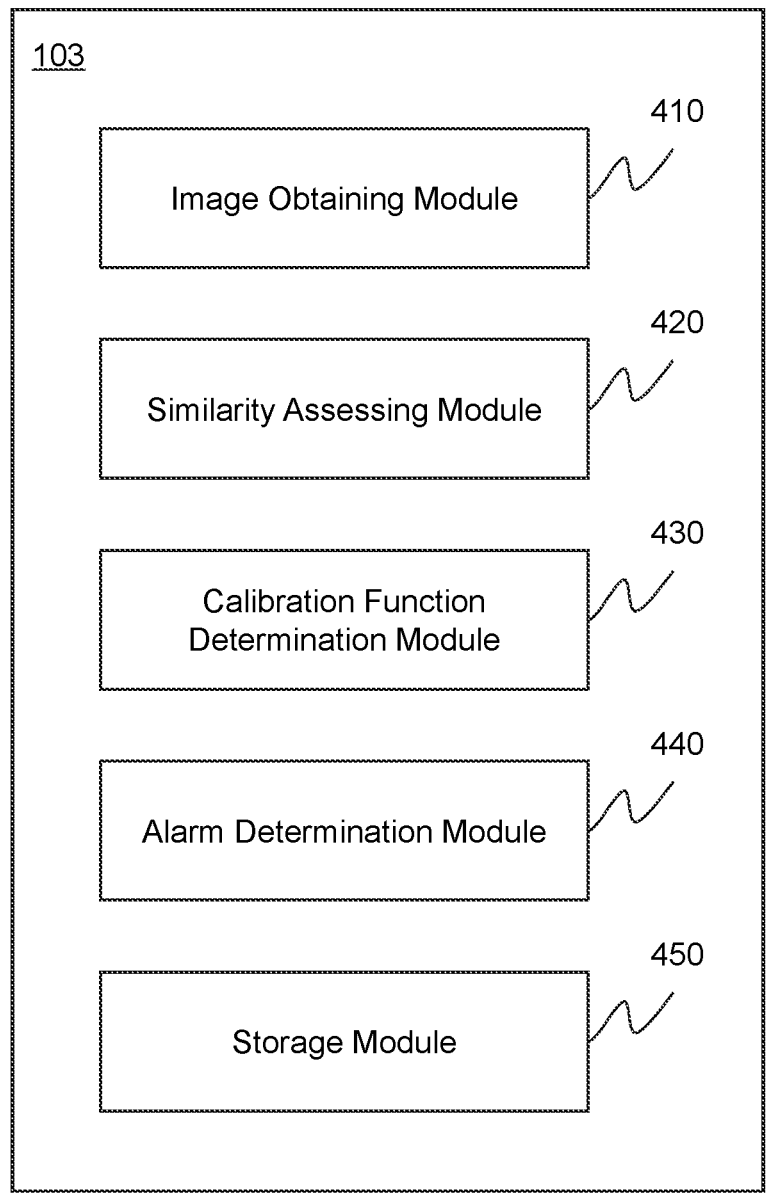
FIG. 4 is a block diagram of an exemplary server according to some embodiments of the present disclosure.

FIG. 4 is a block diagram of an exemplary server 103 according to some embodiments of the present disclosure. The server 103 may include an image obtaining module 410, a similarity assessing module 420, a calibration function determination module 430, an alarm determination module 440 and a storage module 450. The server 103 may include more or fewer components without loss of generality. For example, two of the modules may be combined into a single module, or one of the modules may be divided into two or more modules. As another example, one or more of the modules may reside on different computing devices (e.g., a desktop, a laptop, a mobile device, a tablet computer, a wearable computing device, or the like, or a combination thereof). As still another example, the server 103 may be implemented on the computing device 200 shown in FIG. 2.

Here and also throughout the present disclosure, a module may be implemented in many different ways and as hardware, software or in different combinations of hardware and software. For example, all or parts of a module implementations may be a processing circuitry that may include part or all of an instruction processor, such as a central processing unit (CPU), a microcontroller, a microprocessor; or an application specific integrated circuit (ASIC), a digital signal processor (DSP), a digital signal processing device (DSPD), a programmable logic device (PLD), a field programmable gate array (FPGA), a controller, other electronic components; or as circuitry that includes discrete logic or other circuit components, including an analog circuit component, a digital circuit component or both; or any combination thereof. The circuitry may include discrete interconnected hardware components or may be combined on a single integrated circuit die, distributed among multiple integrated circuit dies, or implemented in a Multiple Chip Module (MCM) of multiple integrated circuit dies in a common package, as examples.

The image obtaining module 410 may acquire images depicting one or more objects. The images may include a still picture, a video (offline or live streaming), a frame of a video, or a combination thereof. In some embodiments, the images may be obtained from, for example, an encoding device (e.g., the encoder 104), a camera (e.g., the camera 102) and/or a storage device (e.g., the network storage 113, the storage 227 of the computing device 228, the storage 390), or the like, or any combination thereof. In some embodiments, the images may be obtained from, for example, a live feed, a storage device, an IEEE 1394-based interface, a video digitizer, a computer graphics engine, a network connection, or the like, or a combination thereof. The images obtained by the image obtaining module 410 may be stored in the storage module 450, the storage 227, or the storage 390, or sent to the terminal(s) 108 via the network 112.

In some embodiments, the images depicting one or more objects may be captured by a camera configured to monitor an area of interest (AOI). The one or more objects may include a person.

In some embodiments, the images obtained by the image obtaining module 410 may include a first image captured in a first scenario and a second image captured in a second scenario. The first scenario may be different from the second scenario.

In some embodiments, the image obtaining module 410 may transmit the images to other modules of the server 103 for further processing. For example, the image obtaining module 410 may transmit the different images of a same object and one or more sample images to the similarity assessing module 420 for determining one or more degrees of similarity between the different images of the object and the one or more sample image. As another example, the image obtaining module 410 may transmit an image to the alarm determination module 440 for determining whether an object of interest appears in the image. As still an example, the image obtaining module 410 may transmit an image to the storage module 450 for store in a local database or a remote database.

The similarity assessing module 420 may be configured to assess a degree of similarity between two images. A degree of similarity between two images may refer to a probability that the object in one of the two images appears in the other image.

The calibration function determination module 430 may be configured to determine a calibration function that indicates a relationship between different degrees of similarity (e.g., the degree of similarity between the first image of the object and the at least one sample image, and the reference degree of similarity between the second image of the object and the at least one sample image).

In some embodiments, the calibration function determination module 430 may also determine whether a camera has been debugged. The calibration function determination module 430 may determine that the camera has been debugged if there is a calibration function corresponding to the camera.

The alarm determination module 440 may be configured to determine whether a person of interest is found in a surveillance video and generate a signal in response to a determination that the person of interest is found. The alarm determination module 440 may compare a (calibrated) degree of similarity between the image captured by a camera in the surveillance state and the image of a registrant with a threshold for authentication (e.g., 85%, 90%, 95%), and determine that the object of interest is found if the (calibrated) degree of similarity between the image captured by the camera in the surveillance state and the image of a registrant is larger than the threshold for authentication.

The signal generated by the alarm determination module 440 may encode an instruction (also referred to as an alarm) to the terminal 108, informing the user of the terminal 108 that a person of interest is found. Further, the alarm determination module 440 may transmit a signal encoding data related to the person of interest to the terminal 108, including a position of the person of interest, an appearing time of the person of interest, a moving track of the person of interest, or the like, or any combination thereof. The data related to the person of interest may be displayed on the terminal 108 in the form of a text, a chart, an image, a video, an audio, etc.

The storage module 450 may be configured to store data, instructions, and/or any other information related to an object of interest. For example, the storage module 450 may store different images of an object, the first similarity table, the second similarity table, the calibration function, or the like, or any combination thereof. In some embodiments, the storage module 450 may store data obtained from the server 103, the terminal 108, and/or the camera 102. In some embodiments, the storage module 450 may store data and/or instructions that the server 103 may execute or use to perform exemplary methods described in the present disclosure. In some embodiments, the storage module 450 may include a mass storage, a removable storage, a volatile read-and-write memory, a read-only memory (ROM), or the like, or a combination thereof. In some embodiments, the storage module 450 may be implemented on a cloud platform as described elsewhere in the disclosure. In some embodiments, the storage module 450 may be connected to and/or communicate with one or more other components in the server 103. One or more components in the server 103 may access the data or instructions stored in the storage module 450.

It should be noted that the above description of server 103 is merely provided for the purposes of illustration, and not intended to be understood as the only embodiment. For persons having ordinary skills in the art, various variations and modifications may be conduct under the teaching of some embodiments of the present disclosure. However, those variations and modifications may not depart from the protecting of some embodiments of the present disclosure.

Figure 5:
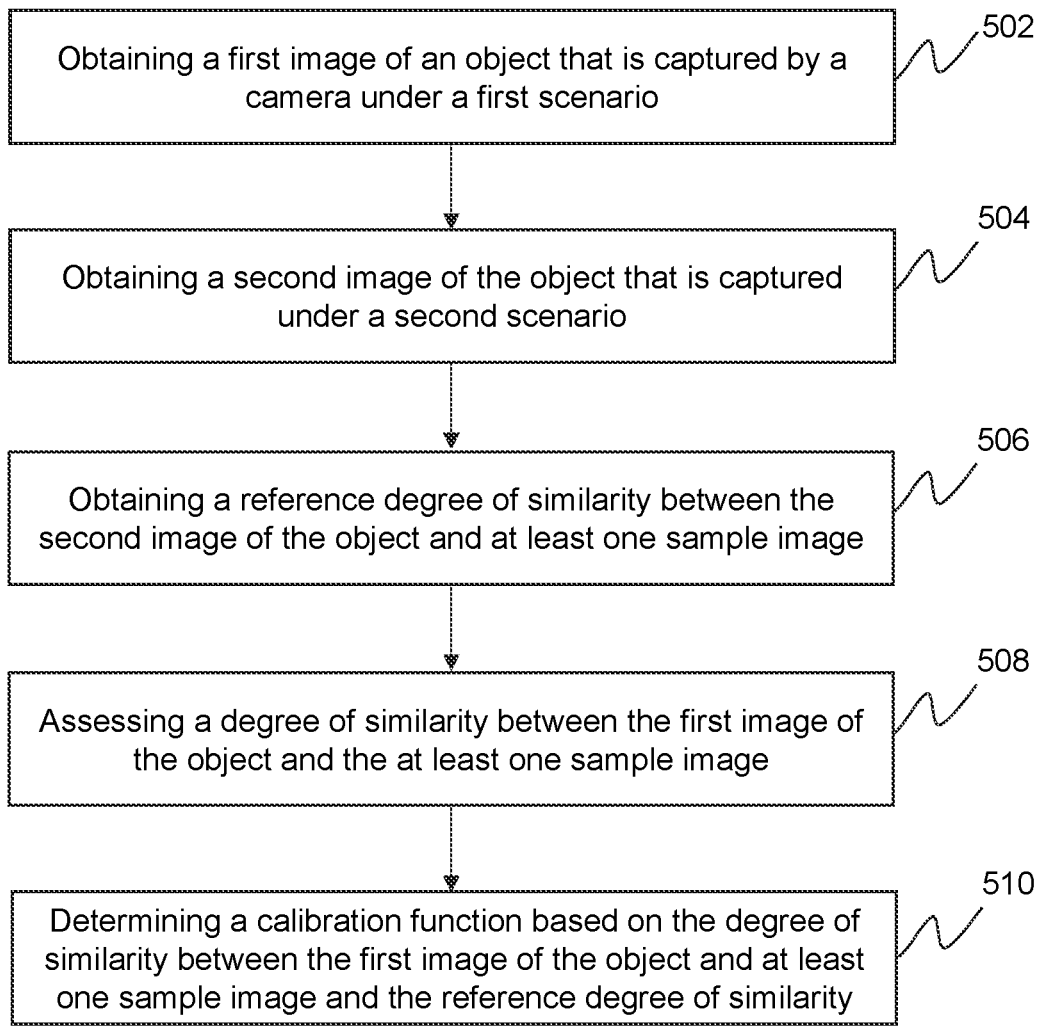
FIG. 5 is a flow chart illustrating an exemplary process for determining a calibration function for a camera according to some embodiments of the present disclosure.

FIG. 5 is a flow chart illustrating an exemplary process 500 for determining a calibration function for a camera according to some embodiments of the present disclosure. In some embodiments, the process 500 may be implemented on the object recognition system 100 as illustrated in FIG. 1. For example, the process 500 may be stored in a storage medium (e.g., the network storage device 113, or the storage 227 of the computing device 228) as a form of instructions, and invoked and/or executed by the server 103. The operations in the process 500 presented below are intended to be illustrative. In some embodiments, the process 500 may be accomplished with one or more additional operations not described, and/or without one or more of the operations discussed. Additionally, the order in which the operations of the process 500 as illustrated in FIG. 5 and described below may not be intended to be limiting.

In 502, the server 103 may obtain a first image of an object that is captured by the camera (e.g., the camera 102) under a first scenario. The operation 502 may be performed by the image obtaining module 410. In some embodiments, the server 103 may obtain the first image from an encoding device (e.g., the encoder 104), a camera (e.g., the camera 102) and/or a storage device (e.g., the network storage 113, the storage 227 of the computing device 228, the storage 390). The first image may be stored in any image format, such as RAW format (referring to unprocessed or minimally processed image data), TIFF (Tagged Input File Format), JPEG (Joint Photographic Experts Group) format, GIF (Graphics Interchange Format), or BMP format (referring to bitmap format), and with any image resolution.

The first scenario may be associated with the camera information related to the camera and the environment condition. The camera information may include one or more setting parameters of the camera, e.g., the setting parameters of the camera in different working states (e.g., a surveillance state, a standby state, a debugging state). The environment condition may include the location of the camera, the ambient illuminating condition of the camera, the weather, the time, or the like, or any combination thereof. It shall be noted that the quality of the first image may vary with the change of the first scenario. For example, the color of the same object in different images may vary according to different illumination conditions. Specifically, the first scenario may be a scenario in which the camera is working in a surveillance state. The first image may be captured when the object is in a moving state (e.g., walking, running).

In some embodiments, the object may be a person, and the first image may present the person's face. The first image may be obtained after the image data captured by the camera is preprocessed. Exemplary preprocessing operations may include an enhancement operation, a transform operation, a compress operation, an edge detection, a segmentation operation, a nose reduction operation, or the like, or a combination thereof. For example, the transform operation may be performed to transform the image data in one domain (e.g., a spatial domain) to another domain (e.g., a frequency domain) for determining a feature of the image data. As another example, the enhancement operation may be performed to enhance a portion (e.g., the human face) of the image data. As still another example, the segmentation operation may be performed to identify or segment the human face in the image data.

In 504, the server 103 may obtain a second image of an object that is captured under a second scenario. The operation 504 may be performed by the image obtaining module 410. In some embodiments, the server 103 may obtain the second image from a storage device (e.g., the network storage 113, the storage 227 of the computing device 228, the storage 390).

The second scenario may be different from the first scenario. In some embodiments, the second image may be captured by a different camera that is placed at a different location from the camera capturing the first image. Further, the second image may be generated when the object is in a substantially stationary state. For example, the second image may be a standard photo of the object that is captured under a standard scenario (e.g., with a standardized sampling environment). The standardized sampling environment may include a preset background, a preset illumination condition, or the like, or a combination thereof. Alternatively, in some embodiments, the second image may be captured by the same camera as the one capturing the first image. In such case, compared with the first scenario, the second scenario may be a scenario in which the camera is working with different setting parameters, or under different environment conditions. For example, the first scenario may be a daytime scenario, and the second scenario may be a nighttime scenario. As another example, the first scenario may be a scenario in a foggy day, and the second scenario may be a scenario in a sunny day.

In 506, the server 103 may obtain a reference degree of similarity between the second image of the object and at least one sample image. The operation 506 may be performed by the similarity assessing module 420.

In some embodiments, one or more reference degrees of similarity between the second image of the object and one or more sample images may be assessed in advance and stored in a storage device (e.g., the storage module 450). When needed, the server 103 may retrieve the reference degree(s) of similarity from the storage device. Alternatively, the similarity assessing module 420 may assess the reference degree similarity between the second image of the object and at least one sample image after the second image of the object is obtained by the image obtaining module 410 as described in operation 504.

The at least one sample image may include any number, such as, 5, 10, 30, 100, 300, etc., of images. The at least one sample image may be selected from a plurality of sample images which are gathered as samples for object collating in an object recognition process. In some embodiments, the plurality of sample images may be divided into different sets based on the categories of objects. Taking human face recognition as an example, the at least one sample image may be selected from a set of sample face images in the plurality of sample images. In some embodiments, the plurality of sample images may also include one or more sample images of the same object as the first/second image. Specifically, the second image may be treated as one sample image and included in the plurality of sample images.

As used herein, the (reference) degree of similarity between the second image of the object and the at least one sample image may refer to a probability that the object in the second image of the object appears in the at least one sample image. In some embodiments, the degree of similarity between two images may be denoted as a similarity value. A larger similarity value may denote a higher degree of similarity between the two images.

In some embodiments, the degree of similarity between two images may be determined by comparing a set of features extracted from the two images.

The set of features may be related to colors, shapes, sizes, positions of one or more components in the two images. In some embodiments, the set of features may be obtained according to default settings of the object recognition system 100. Taking a human face as an example, the set of features may include a skin tone, a hair color, a hair length, the height and the width of the human face, a head shape (elongated or round shape) and relative locations of one or more organs (e.g., the eyes, the mouth, the ear, the nose), or the like, or any combination thereof. In some embodiments, the set of features may be adjustable. For example, a user may create a new set of features used to determine the degree of similarity. The user may add one or more features (e.g., the eye color) to the set of features and/or delete one or more features (e.g., the hair color) from the set of features. The user may alter the set of features via the terminal 108. For example, the terminal 108 may be associated with a monitoring entity (e.g., a traffic police department). An administrator or an employee of the monitoring entity may send a command to the server 103 via the terminal 108 to alter the set of features in determining the degree of similarity.

In some embodiments, the server 103 may extract the set of features using one or more feature descriptors. Exemplary feature descriptors may include a scale invariant feature transform (SIFT), a speeded up robust feature (SURF), a multi-support region order-based gradient histogram (MROGH), a binary robust independent element feature (BRIEF), an affine SIFT, a convolutional neutral network (CNN), a completed kernel fisher discriminant (CKFD), an iterative closest point (ICP), a Hausdorff distance, an extended Gaussian image (EGI), a point signature (PS), or the like, or a combination thereof. The server 103 may discriminate the set of features using various methods. For example, the width and height may be determined using the span of the pixels that are assigned as skin during segmentation. For another example, the shape of a face may be determined using a classifier-based approach. A training set of elongated and round faces may be collected. As an example, a learning algorithm such as an Adaboost algorithm, a CNN algorithm, a support vector classifier algorithm or a nearest neighbor classifier algorithm may be used to learn how to classify a face as elongated or round based on the training set.

Alternatively, the degree of similarity between two images may be determined according to one or more models. An exemplary model may utilize a convolutional network (e.g., a CNN) that receives the two images as input and then outputs the degree of similarity between the two images as a result. The degree of similarity between two images may be determined based on the distance between the two images, such as Euclidean distance, weighted Euclidean distance, standardized Euclidean distance, cosine distance, hamming distance, Manhattan distance (also referred to as city block distance), Chebyshev distance, Mahalanobis distance, Jaccard distance, etc. It shall be noted that the above description of the determination of degree of similarity between two images is merely provided for illustration purposes, and is not intended to limit the scope of the present disclosure.

It shall be noted that the reference degree of similarity between the second image of the object and the at least one sample image may be denoted in various forms. Referring to FIG. 7 as an example, a first similarity table including a plurality of reference degrees of similarity may be illustrated. In some embodiments, the first similarity table may be also referred to as a standardized similarity table. The first column of the table may include a second image "A_test" including a human face of a person A. The second column of the table may include a plurality of sample face images, each of which corresponds to the second image "A_test". The plurality of sample face images may include a sample face image "A_regis" of the person A, a sample face image "B_regis" of a person B, a sample face image "C_regis" of a person C, a sample face image "D_regis" of a person D, a sample face image "E_regis" of a person E, etc. The third column of the table may include a plurality of values indicating the reference degrees of similarity (also referred to as reference similarity values) between the second image "A_test" and corresponding sample face images in the second column. For example, as shown in FIG. 7, the reference degree of similarity between the second image "A_test" and the sample image "A_regis" may be denoted as 98%, indicating that the likelihood of the face in the second image "A_test" presenting in the sample images "A_regis" is 98%. In 508, the server 103 may assess a degree of similarity between the first image of the object and the at least one sample image. The operation 508 may be performed by the similarity assessing module 420. Similar to the reference degree of similarity described in 506, the degree of similarity between the first image of the object and the at least one sample image may refer to a probability that the object in the first image of the object appears in the at least one sample image.

It shall be noted that the degree of similarity between the first image of the object and the at least one sample image may be denoted in the similar form as the reference degree of similarity. For brevity, the degree of similarity between the first image of the object and the at least one sample image and the reference degree of similarity between the second image of the object and the at least one sample image may be illustrated in a combined manner. Referring to FIG. 8 as an example, a second similarity table including a plurality of reference degrees of similarity and a plurality of degrees of similarity may be illustrated. The first column of the table may include a first image "A_test_K" including a human face of the person A. The first image may be captured by a camera "K" (i.e., the first camera). The second column of the table may include a second image "A_test" including a human face of the same person A. The third column of the table may include a library of sample face images stored in the object recognition system 100. The library of sample face images may include a sample face image "A_regis" of the person A, a sample face image "B_regis" of the person B, a sample face image "C_regis" of the person C, a sample face image "D_regis" of the person D, a sample face image "E_regis" of the person E, etc. The fourth column of the table may include a plurality of values indicating the degrees of similarity (also referred to as "similarity values") between the first image "A_test_K" and corresponding sample face images in the third column. The fifth column of the table may include a plurality of values indicating the reference degrees of similarity (also referred to as "reference similarity values") between the second image "A_test" and corresponding sample images in the second column. For example, as shown in FIG. 8, the degree of similarity between the first image "A_test_K" and the sample face image "A_regis" may be denoted as 94%, indicating that the likelihood of the human face in the first image "A_test_K" presenting in the sample face images "A_regis" is 94%. By comparing the values in the fourth column and the fifth column, it can be noted that the recognition process of a same object may exert different results according to different scenarios in which the images of the object are captured.

In 510, the server 103 may determine a calibration function based on the degree(s) of similarity between the first image of the object and the at least one sample image and the reference degree(s) of similarity between the second image of the object and the at least one sample image. The operation 510 may be performed by the calibration function determination module 430. The calibration function may indicate a relationship between the degree of similarity between the first image of the object and the at least one sample image and the reference degree of similarity between the second image of the object and the at least one sample image.

In some embodiments, the server 103 may determine the relationship between each pair of degree of similarity and reference degree of similarity, and then determine the calibration function based on the relationships of all pairs of degree of similarity and reference degree of similarity. A pair of degree of similarity and reference degree of similarity may correspond to a same sample face image, based on which the degree of similarity and the reference degree of similarity are determined.

For illustration purpose, the server 103 may map a degree of similarity to a corresponding reference degree of similarity using a piecewise linear mapping model, a curve fitting model, a machine learning model, or the like, or any combination thereof.

Taking a piecewise linear mapping model as an example, the calibration function may be denoted by Equation (1) as follows:

$$f(x) = \begin{cases} f_1(x) \text{ for } x \in D_1 \\ f_2(x) \text{ for } x \in D_2 \\ ... \\ f_n(x) \text{ for } x \in D_n \end{cases} \quad (1)$$

where x refers to a degree of similarity, $f(x)$ refers to a corresponding reference degree of similarity, n is an integer no less than 2, $f_k(x)$ refer to linear and/or affine functions with k=1, ..., n, $D_n$ refer to the value range of x. To each bounding value $x=x_k$ between $D_k$ and $D_{k+1}$, it may use either $f_k(x)$ or $f_{k+1}(x)$. For example, if x is equal to 50%, $D_k$ may be (30%,50%], and $D_{k+1}$ may be (50%,80%).

Taking a machine learning model as another example, the calibration function may be a neural network model. The neural network model may receive an input of a degree of similarity, and output a reference degree of similarity or a difference between the degree of similarity and the estimated reference degree of similarity. The neural network model may be trained based on a preliminary neural network model. The preliminary neural network model may be constructed based on at least one of a convolutional neural network model (CNN), a fully convolutional neural network (FCN) model, a generative adversarial network (GAN), neural network models may include a back propagation (BP) neural network model, a radial basis function (RBF) neural network model, a deep belief nets (DBN) neural network model, an Elman neural network model, or the like, or a combination thereof.

The neural network model may be trained using a plurality of training sets (e.g., including a plurality of degrees of similarity and a plurality of corresponding reference degrees of similarity) iteratively. During the iterations, one or more parameters of the neural network model may be updated according to a cost function (also referred to as a loss function). The cost function may be configured to assess a difference between an output value of the neural network model and a desired value. The output of the neural network model may be generated based on an input of a degree of similarity (e.g., the degree of similarity between the first image "A_test_K" and the sample face image "A_regis"). The desired value associated with the output may be a reference degree of similarity corresponding to the input degree of similarity (e.g., the reference degree of similarity between the second image "A_test" and the sample image "A_regis"). A first condition may be determined to indicate whether the neural network model is sufficiently trained. The neural network model may be sufficiently trained in response to a determination that the first condition is satisfied. In some embodiments, the first condition may relate to a value of the cost function. For example, the first condition may be satisfied if the value of the cost function is minimal or smaller than a threshold (e.g., a constant). As another example, the first condition may be satisfied if the values of the cost function in multiple iterations converge. In some embodiments, the convergence may be deemed to have occurred if the variation of the values of the cost function in two or more consecutive iterations is equal to or smaller than a threshold (e.g., a constant).

Take a curve fitting model as another example, the calibration function may be determined by calculating a fitting curve based on the plurality of reference degrees of similarity and the plurality of degrees of similarity. For example, the calibration function may be a linear function that describes a linear mapping relationship between a degree of similarity and a corresponding reference degree of similarity.

In some embodiments, the calibration function may be further applied to calibrate one or more degrees of similarity between the one or more images captured by the camera and an image of a registrant stored in a memory. Detailed descriptions regarding the application of the calibration function may be found elsewhere in the present disclosure (e.g., FIG. 6, and the descriptions thereof).

It should be noted that the above description of process 500 is merely provided for the purposes of illustration, and not intended to be understood as the only embodiment. For persons having ordinary skills in the art, various variations and modifications may be conduct under the teaching of some embodiments of the present disclosure. In some embodiments, some operations may be reduced or added. However, those variations and modifications may not depart from the protecting of some embodiments of the present disclosure. For example, one or more other optional operations (e.g., a storing operation) may be added in the exemplary process 500. In the storing operation, the server 103 may store the degree of similarity, the reference degree of similarity in any storage device (e.g., the network storage device 113, or the storage 227 of the computing device 228) disclosed elsewhere in the present disclosure.

Figure 6:
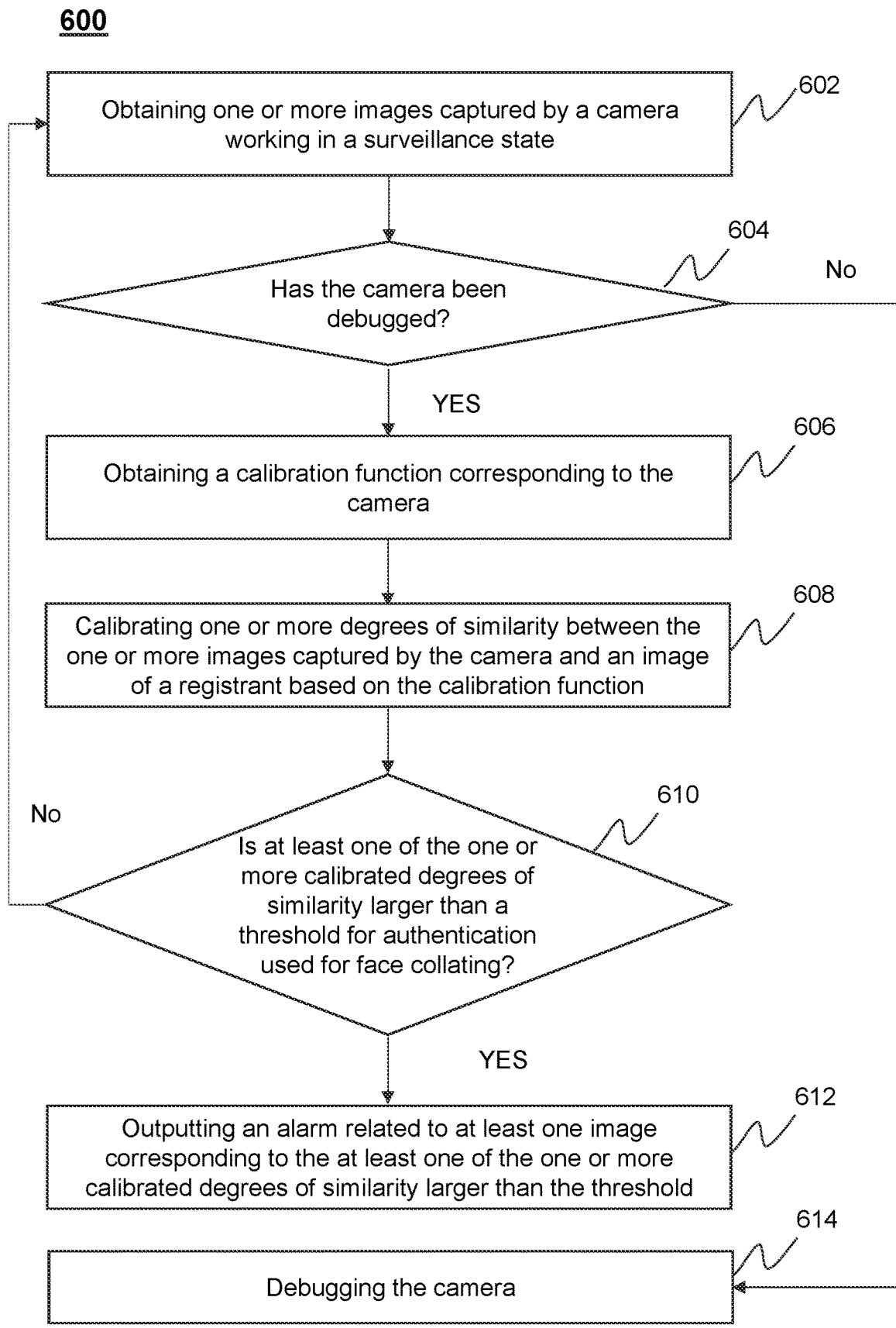
FIG. 6 is a flow chart illustrating an exemplary process for recognizing an object according to some embodiments of the present disclosure.

FIG. 6 is a flow chart illustrating an exemplary process 600 for recognizing an object according to some embodiments of the present disclosure. In some embodiments, the process 600 may be implemented on the object recognition system 100 as illustrated in FIG. 1. For example, the process 600 may be stored in a storage medium (e.g., the network storage device 113, or the storage 227 of the computing device 228) as a form of instructions, and invoked and/or executed by the server 103. The operations in the process 600 presented below are intended to be illustrative. In some embodiments, the process 600 may be accomplished with one or more additional operations not described, and/or without one or more of the operations discussed. Additionally, the order in which the operations of the process 600 as illustrated in FIG. 6 and described below may not be intended to be limiting.

In 602, the server 103 may obtain one or more images captured by a camera working in a surveillance state. The operation 602 may be performed by the image obtaining module 410. The camera working in a surveillance state may be a portion of a surveillance system configured to monitor an area of interest (AOI). The surveillance system may include a plurality of cameras, each camera with a label used for identification. The plurality of cameras may capture images that depict one or more objects of interest. The one or more objects of interest may include a person, a vehicle, an item, or the like, or any combination thereof. In some embodiments, the surveillance system may be configured to search for a target object based on the captured images.

For brevity, the one or more images captured by a camera working in a surveillance state may be also referred to as one or more third images. The one or more third images may include a still picture, a video (offline or live streaming), a frame of a video, or a combination thereof. In some embodiments, the one or more third images may be obtained from, for example, a live feed, a storage device, an IEEE 1394-based interface, a video digitizer, a computer graphics engine, a network connection, or the like, or a combination thereof.

In some embodiments, a third image may be an original image captured by the camera and include location information indicating the location of the object in the original image. In some embodiments, the third image may be obtained by preprocessing an original image captured by the camera. The server 103 may preprocess the original image by detecting and extracting objects in the original image. The object detection may include the recognition of an object (e.g., determining and storing the type of an object) and identify the position of the object (e.g., determining and storing the location of an object). For example, the server 103 may determine that there are 2 persons, 1 car and 3 animals in an original image and store the positions of them in the original image. Exemplary object detection method may include Region-based Convolutional Network (R-CNN), Spatial Pyramid Pooling Network (SPP-Net), Fast Region-based Convolutional Network (Fast R-CNN), Faster Region-based Convolutional Network (Faster R-CNN), etc.

In 604, the server 103 may determine whether the camera has been debugged. The operation 604 may be performed by the calibration function determination module 430. The server 103 may determine that the camera has been debugged if there is a calibration function corresponding to the camera. For example, the server 103 may determine that the camera is in a nighttime scenario and determine whether there is a calibration function for the nighttime scenario corresponding to the camera. For another example, the server 103 may determine that the camera is in a foggy scenario and determine whether there is a calibration function for the foggy scenario corresponding to the camera. In some embodiments, regardless of the changes of the environment, there is only one calibration function for each camera, wherein the calibration function is related to the resolution of the camera, the position of the camera, the standardized illumination of the camera, etc. In response to a determination that the camera has been debugged, the process 600 may proceed to 606; otherwise, the process 600 may proceed to operation 614.

In 606, the server 103 may obtain a calibration function corresponding to the camera. The server 103 may obtain the calibration function corresponding to the camera from the calibration function determination module 430 or the storage module 450. In some embodiments, the server 103 may obtain the calibration function based on the label of the camera. In some embodiments, the calibration function corresponding to the camera may be determined in connection with the operation 510 in FIG. 5. It shall be noted that, in some embodiments, more than one calibration function corresponding to the camera may be obtained. The more than one calibration function may correspond to different scenarios in which images are captured. For example, one calibration function may be used to calibrate the registrant degree of similarity for the images captured by the camera in daytime, and another calibration function may be used to calibrate the registrant degree of similarity for the images captured by the camera in nighttime. As another example, one calibration function may be used to calibrate the registrant degree of similarity for the images captured by the camera in a foggy day, and another calibration function may be used to calibrate the registrant degree of similarity for the images captured by the camera in a sunny day.

In 608, the server 103 may calibrate one or more degrees of similarity between the one or more third images captured by the camera and an image of a registrant based on the calibration function. The operation 608 may be performed by the alarm determination module 440. The image of a registrant may be a face image of a person of interest. For example, the image of a registrant may include a face image of a suspicious-looking person. For another example, the image of a registrant may include a face image of a missing person.

The server 103 may determine the one or more degrees of similarity between the one or more third images and the image of a registrant (also referred to as "registrant degree of similarity" for brevity) by determining each degree of similarity between each of the one or more third images and the image of a registrant. Details of the determination of the registrant degree of similarity may be similar to the determination of the reference degree of similarity described in connection with operation 506 and will not be described herein.

In some embodiments, before determining the registrant degree of similarity, the server 103 may determine whether the one or more third images are capable of being collated and only choose the ones capable of being collated to determine the registrant degree of similarity. An image may not be capable of being collated if the quality of the image is too low, or if the image is captured from a direction that not enough information regarding the object to be collated is collected.

In some embodiments, the server 103 may evaluate the quality of an image based on the image definition. The server 103 may determine that the quality of the image is too low if the image definition is lower than a definition threshold. The definition threshold may be a default setting of the object recognition system 100, or may be adjustable under different situations. In some embodiments, the image definition may be determined based on a gradient function (e.g., Brenner gradient function, Tenengrad gradient function, Laplacian gradient function), Sum of Modulus of gray Difference (SMD) function, entropy function, or the like, or any combination thereof.

In some embodiments, the server 103 may analyze the information regarding the object to be collated. Taking face recognition as an example, two face images may be determined to be capable of being collated if the difference between the face angles in the images is smaller than an angle threshold; otherwise, the two face images may be determined to be incapable of being collated. The angle threshold may be a default setting of the object recognition system 100, or may be adjustable under different situations. It shall be noted that the appearance of a face in the image may significantly change if the face angle is changed, and the accuracy of face recognition may decrease.

The server 103 may determine one or more calibrated degrees of similarity based on the calibration function. For example, the server 103 may input a registrant degree of similarity into a neural network model to generate a calibrated degree of similarity. As another example, the server 103 may calculate an offset value to compensate the registrant degree of similarity. The value of the registrant degree of similarity may plus the offset value to generate the calibrated degrees of similarity.

In 610, the server 103 may determine whether at least one of the one or more calibrated degrees of similarity is larger than a threshold for authentication used for face collating. The operation 610 may be performed by the alarm determination module 440. In some embodiments, the threshold for authentication used for face collating may be default settings of the object recognition system 100. For example, the threshold for authentication used for face collating may be 85%, 90%, 95%, etc. In some embodiments, the threshold for authentication used for face collating may be adjusted according to an object detection error rate that denotes the erroneous judgement of the server 103 in object recognition process. In response to a determination that at least one of the one or more degrees of similarity is larger than the threshold for authentication used for face collating, the process 600 may proceed to 612; otherwise, the process 600 may proceed to operation 602.

In 612, the server 103 may output an alarm related to at least one image corresponding to the at least one of the one or more calibrated degrees of similarity larger than the threshold for authentication. The operation 612 may be performed by the alarm determination module 440. The server 103 may determine that a match has been achieved between the one or more captured images and the image of a registrant. In response to the determination that the person in the image of a registrant is found in at least one of the one or more images, the server 103 may transmit at least one signal to the terminal 108. In some embodiments, the server 103 may transmit a signal encoding an instruction (also referred to as an alarm) to the terminal 108, informing the user of the terminal 108 that a person of interest is found.

Further, the server 103 may transmit a signal encoding data related to the person of interest to the terminal 108, including a position of the person of interest, an appearing time of the person of interest, a moving track of the person of interest, or the like, or any combination thereof. The data related to the person of interest may be displayed on the terminal 108 in the form of a text, a chart, an image, a video, an audio, etc.

In 614, the server 103 may debug the camera. The operation 614 may be performed by the calibration function determination module 430. The server 103 may debug the camera by determining a calibration function for the camera. Detailed descriptions regarding the determination of the calibration function may be found elsewhere in the present disclosure (e.g., in FIG. 5, and the descriptions thereof).

It should be noted that the above description of process 600 is merely provided for the purposes of illustration, and not intended to be understood as the only embodiment. For persons having ordinary skills in the art, various variations and modifications may be conduct under the teaching of some embodiments of the present disclosure. In some embodiments, some operations may be reduced or added. However, those variations and modifications may not depart from the protecting of some embodiments of the present disclosure. For example, instead of calibrating the registrant degree of similarity, the server 103 may use the calibration function to calibrate the threshold for authentication. The calibration of the threshold for authentication may include increasing or decreasing the value of the threshold for authentication, which may lead to similar results as decreasing or increasing the registrant degree of similarity.

Having thus described the basic concepts, it may be rather apparent to those skilled in the art after reading this detailed disclosure that the foregoing detailed disclosure is intended to be presented by way of example only and is not limiting. Various alterations, improvements, and modifications may occur and are intended to those skilled in the art, though not expressly stated herein. These alterations, improvements, and modifications are intended to be suggested by this disclosure, and are within the spirit and scope of the exemplary embodiments of this disclosure.

Moreover, certain terminology has been used to describe embodiments of the present disclosure. For example, the terms "one embodiment," "an embodiment," and "some embodiments" mean that a particular feature, structure or characteristic described in connection with the embodiment is included in at least one embodiment of the present disclosure. Therefore, it is emphasized and should be appreciated that two or more references to "an embodiment" or "one embodiment" or "an alternative embodiment" in various portions of this specification are not necessarily all referring to the same embodiment. Furthermore, the particular features, structures or characteristics may be combined as suitable in one or more embodiments of the present disclosure.

Further, it will be appreciated by one skilled in the art, aspects of the present disclosure may be illustrated and described herein in any of a number of patentable classes or context including any new and useful process, machine, manufacture, or composition of matter, or any new and useful improvement thereof. Accordingly, aspects of the present disclosure may be implemented entirely hardware, entirely software (including firmware, resident software, micro-code, etc.) or combining software and hardware implementation that may all generally be referred to herein as a "module," "unit," "component," "device," or "system." Furthermore, aspects of the present disclosure may take the form of a computer program product embodied in one or more computer readable media having computer readable program code embodied thereon.

A computer readable signal medium may include a propagated data signal with computer readable program code embodied therein, for example, in baseband or as part of a carrier wave. Such a propagated signal may take any of a variety of forms, including electro-magnetic, optical, or the like, or any suitable combination thereof. A computer readable signal medium may be any computer readable medium that is not a computer readable storage medium and that may communicate, propagate, or transport a program for use by or in connection with an instruction execution system, apparatus, or device. Program code embodied on a computer readable signal medium may be transmitted using any appropriate medium, including wireless, wireline, optical fiber cable, RF, or the like, or any suitable combination of the foregoing.

Computer program code for carrying out operations for aspects of the present disclosure may be written in any combination of one or more programming languages, including an object oriented programming language such as Java, Scala, Smalltalk, Eiffel, JADE, Emerald, C++, C #, VB. NET, Python or the like, conventional procedural programming languages, such as the "C" programming language, Visual Basic, Fortran 2003, Perl, COBOL 2002, PHP, ABAP, dynamic programming languages such as Python, Ruby and Groovy, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computing environment or offered as a service such as a Software as a Service (SaaS).

Furthermore, the recited order of processing elements or sequences, or the use of numbers, letters, or other designations therefore, is not intended to limit the claimed processes and methods to any order except as may be specified in the claims. Although the above disclosure discusses through various examples what is currently considered to be a variety of useful embodiments of the disclosure, it is to be understood that such detail is solely for that purpose, and that the appended claims are not limited to the disclosed embodiments, but, on the contrary, are intended to cover modifications and equivalent arrangements that are within the spirit and scope of the disclosed embodiments. For example, although the implementation of various components described above may be embodied in a hardware device, it may also be implemented as a software only solution, e.g., an installation on an existing server or mobile device.

Similarly, it should be appreciated that in the foregoing description of embodiments of the present disclosure, various features are sometimes grouped together in a single embodiment, figure, or description thereof for the purpose of streamlining the disclosure aiding in the understanding of one or more of the various embodiments. This method of disclosure, however, is not to be interpreted as reflecting an intention that the claimed subject matter requires more features than are expressly recited in each claim. Rather, claim subject matter lie in less than all features of a single foregoing disclosed embodiment.

I claim:

1. A system, comprising:
a camera configured to capture one or more images for use in an object recognition process;
a storage device storing a set of instructions; and
at least one processor in communication with the storage device, wherein when executing the instructions, the at least one processor is configured to cause the system to:
obtain a first image of an object, wherein the first image is captured by the camera under a first scenario;
obtain a second image of the object, wherein the second image is captured under a second scenario;
obtain a reference degree of similarity between the second image of the object and at least one sample image;
assess a degree of similarity between the first image of the object and the at least one sample image; and
determine a calibration function to compensate the degree of similarity between the first image of the object and the at least one sample image based on the reference degree of similarity between the second image of the object and the at least one sample image and the degree of similarity between the first image of the object and the at least one sample image, wherein
the calibration function is to be applied in association with the one or more images captured by the camera in the object recognition process.

2. The system of claim 1, wherein, to determine the calibration function to compensate the degree of similarity between the first image of the object and the at least one sample image, the at least one processor is configured to cause the system to:
designate a function indicating a relationship between the degree of similarity between the first image of the object and the at least one sample image and the reference degree of similarity between the second image of the object and the at least one sample image as the calibration function.

3. The system of claim 1, wherein the calibration function is to be applied to calibrate one or more degrees of similarity between the one or more images captured by the camera and an image of a registrant stored in a memory.

4. The system of claim 3, wherein the image of the registrant includes a face image of a suspicious-looking person.

5. The system of claim 3, wherein the one or more degrees of similarity between the one or more images captured by the camera and the image of the registrant is to be compared with a threshold for authentication used for face collating in the object recognition process.

6. The system of claim 1, wherein the first image of the object is captured when the camera is working in a surveillance state.

7. The system of claim 6, wherein the second image of the object is captured when the object is in a substantially stationary state.

8. The system of claim 1, wherein the first image of the object includes a face image of a person.

9. The system of claim 8, wherein the at least one sample image is selected from a library of face images.

10. The system of claim 9, wherein the library of face images includes at least one reference face image of the person.

11. The system of claim 9, wherein, to assess the degree of similarity between the first image of the object and at least one sample image, the at least one processor is configured to cause the system to:
select a plurality of face images in the library of face images; and
determine a plurality of first similarity values, each of the plurality of first similarity values indicating a similarity between the first image of the object and one of the plurality of face images.

12. A system, comprising:
a storage device to store a plurality of sample images; and
a processing device, communicatively coupled to the storage device, to:
determine, based on a first image of a first object captured in a first scenario, a first similarity table comprising first similarity values, each one of the first similarity values representing a likelihood of the first object presenting in a corresponding one of the plurality of sample images;
determine, based on the second image of the first object captured in a second scenario, a second similarity table comprising second similarity values, each one of the second similarity values representing a likelihood of the first object presenting in a corresponding one of the plurality of sample images;
determine a compensation factor based on a mapping between the first similarity table and the second similarity table; and
responsive to receiving a third image captured in the first scenario, determine presence of a second object in the third image by comparing a threshold value with a similarity value, adjusted by the compensation factor, between the third image with an image of a registrant.

13. The system of claim 12, wherein the object comprises a human object.

14. The system of claim 12, wherein the first image of the object is captured in the first scenario using a first camera, and wherein the second image of the object is captured in the second scenario using a second camera.

15. The system of claim 14, wherein the third image is captured using the first camera.

16. The system of claim 12, wherein the processing device is further to:
receive the first image of the object captured by the first camera in a first location; and
receive the second image of the object captured by the second camera in a second location.

17. The system of claim 12, wherein the processing device is further to:
determine the threshold based on an object detection error rate in the first scenario.

18. The system of claim 12, wherein the processing device is further to:
receive the second image of the object captured in the second scenario;
add the second image to the plurality of sample images; and
determine, based on the second image of the object captured in the second scenario, the first similarity table.

19. The system of claim 12, wherein the image of a registrant includes a face image of a suspicious-looking person.

* * * * *